Sept. 21, 1937.  F. G. FOSS  2,093,429
SEALED CAN TESTING MACHINE
Filed June 24, 1933  4 Sheets-Sheet 1

INVENTOR
Fred G. Foss
BY
ATTORNEYS

Sept. 21, 1937.　　　　F. G. FOSS　　　　2,093,429
SEALED CAN TESTING MACHINE
Filed June 24, 1933　　　4 Sheets-Sheet 2
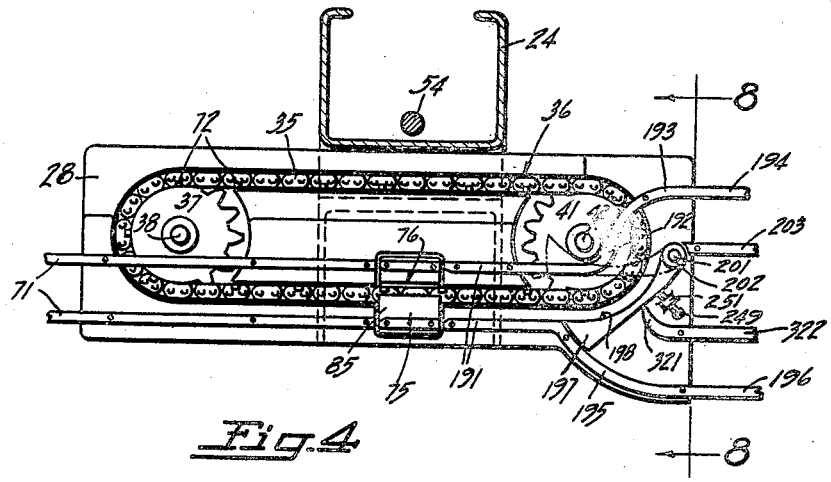
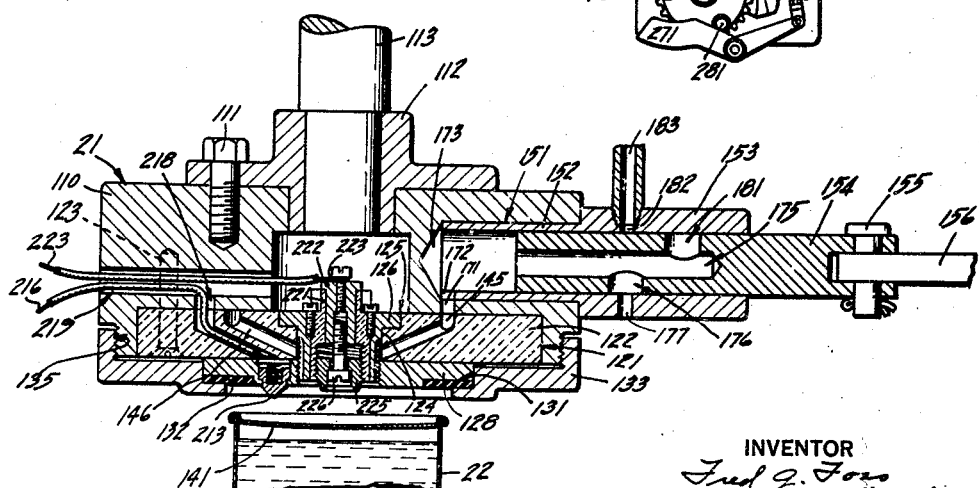
INVENTOR
Fred G. Foss
BY
ATTORNEYS

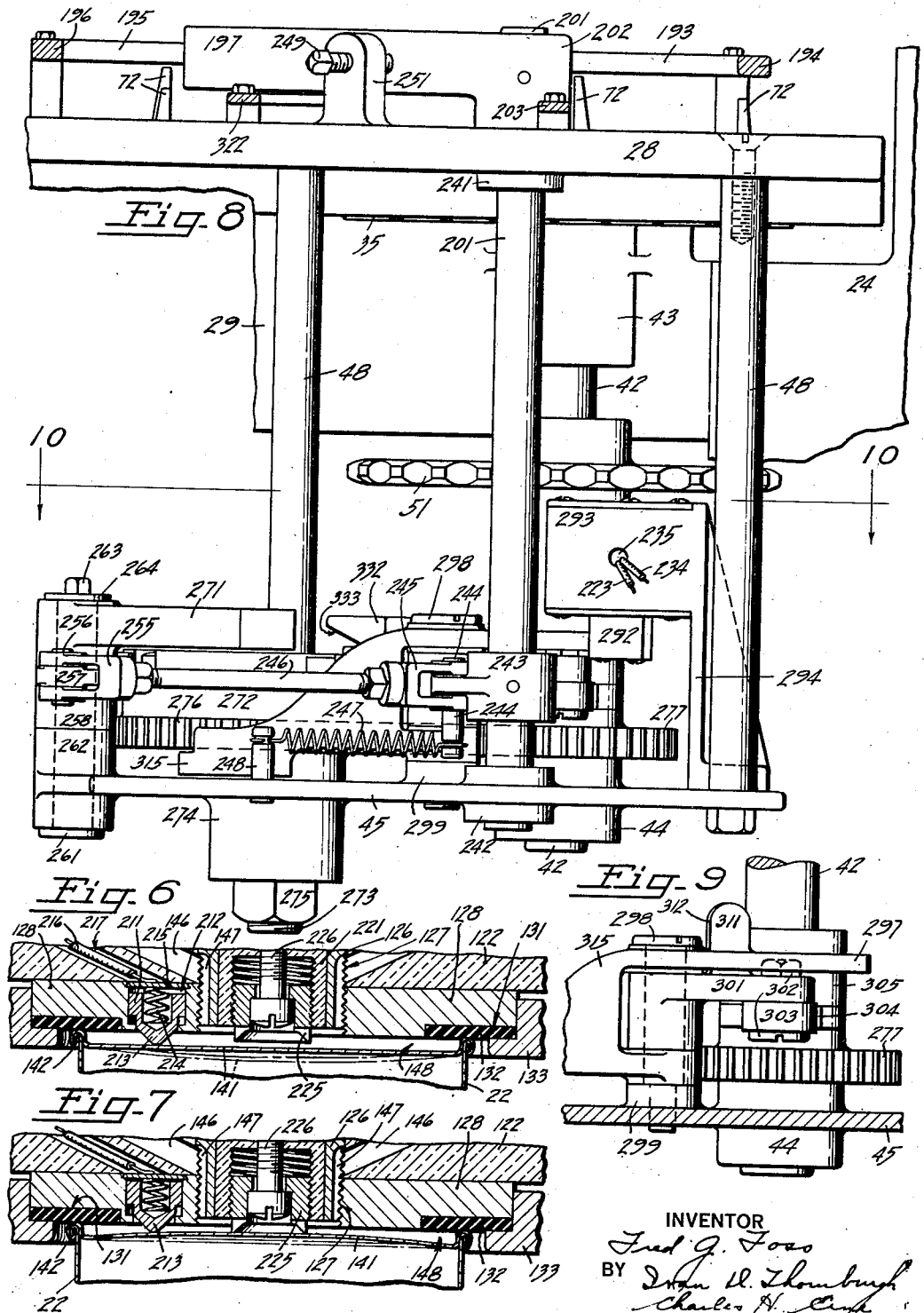

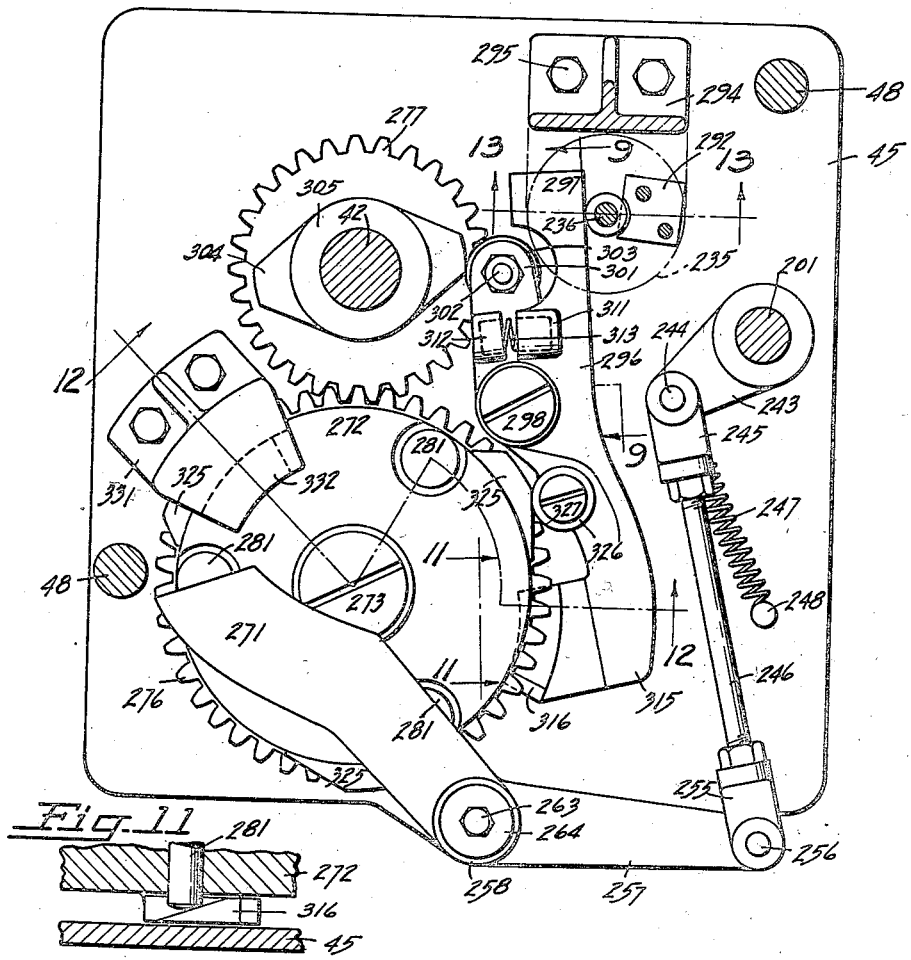
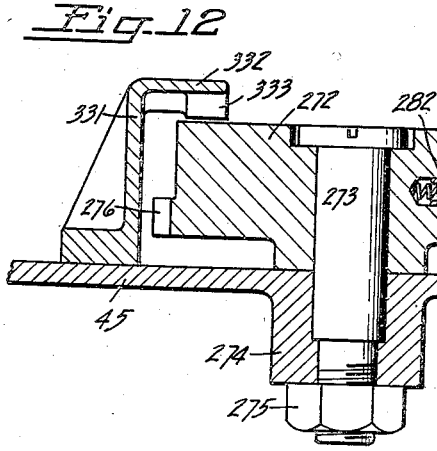
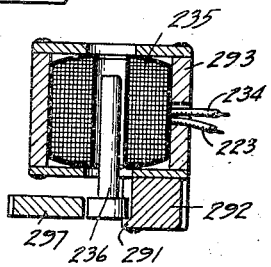

Patented Sept. 21, 1937

2,093,429

UNITED STATES PATENT OFFICE 2,093,429

SEALED CAN TESTING MACHINE

Fred G. Foss, Hillside, N. J., assignor to American Can Company, New York, N. Y., a corporation of New Jersey Application June 24, 1933, Serial No. 677,506

4 Claims. (Cl. 73—51)

The present invention relates to sealed can testing machines and has particular reference to machines for testing cans which have been previously sealed in vacuum, such cans maintaining a substantial part of their vacuous condition as long as they are tight but losing all or part of their vacuum when they are leaky. The degree of loss of vacuum depends upon the size of the leak and the time the cans have leaked, and in all of such cases atmospheric air passes into the sealed cans through the leaks and destroys or disturbs the vacuum.

The present invention contemplates confining a flexible metallic part of the can under test, usually an end by holding it in a testing head and the atmospheric pressure is then removed from the outside face of the end. The end may flex outwardly at such a time which is indicative of a leak or where the vacuum still obtains in the sealed can there will be no movement of the end. The interior of a leaky can at such time by reason of the air which has entered through the leak may be caused to contain an air pressure which exerts its force against the inner face of the flexible part to bulge or flex it outwardly.

The testing machine being considered utilizes this flexing movement by having the end move into engagement with two electric contacts in the testing head and the metallic end provides an electric path and bridges the gap electrically speaking between the contacts and closes an electric circuit for the flow of eletrical energy. This electrical energy provides proper indication of the leaky condition of the can and in one embodiment operates a relay for separating the leaky from the good cans.

It is an object, therefore, of the present invention to provide a machine simple in construction and simple in operation which utilizes a flow of electric energy as an indicator of leaky conditions in the sealed can under test, such an electric current utilizing the can part as a bridge between contacts which, until such a bridge is formed by a flexing can end of a leaky can, serves as a gap or break and while this break obtains the electric testing energy is non-existent. In other words, there is no flow of electric energy as long as the cans are good and tight.

The automatic separation after testing of the leaky cans from the good cans is also an object of the invention such being accomplished accurately and rapidly.

A further object of the invention is the provision of a testing head in which the flexible ends of the cans while held in testing position have full and unrestricted freedom for movement to indicate a leaky condition and these moving and flexible ends need only touch the electric contacts in the head in order to effect the test. This provision makes possible an extremely accurate test gage which may be adjusted so that a predetermined and exact maximum of pressure may be used for the division point of pressure allowable in the can to be considered as a good can.

Numerous other objects and advantages of the invention will be apparent as it is better understood from the following description, which, taken in connection with the accompanying drawings, discloses a preferred embodiment thereof.

Referring to the drawings:

Figure 1 is a longitudinal, vertical section partially shown in elevation of an apparatus adapted for testing sealed vacuumized cans and embodying the present invention;

Figs. 2, 3 and 4 are plan sectional views taken substantially along the respective broken lines 2—2, 3—3 and 4—4 in Fig. 1, Fig. 2 also showing a wiring diagram of the electric circuit used in the apparatus;

Fig. 5 is an enlarged sectional view of the testing head being taken substantially along the line 5—5 in Fig. 2 and illustrating a sealed can prior to insertion into testing position within the head;

Figs. 6 and 7 are views similar to the lower, middle part of the section head as shown in Fig. 5, these being drawn to an enlarged scale and illustrating the can in testing position in the head and showing different positions of the flexible can end;

Fig. 8 is an end elevation partially in section of a portion of the apparatus as viewed substantially along the line 8—8 in Fig. 3;

Fig. 9 is a sectional detail of the can separating devices being taken substantially along the line 9—9 in Fig. 10;

Fig. 10 is a sectional plan view taken substantially along the line 10—10 in Fig. 8; and Figs. 11, 12 and 13 are sectional details of various parts of the can separating device being taken substantially along the respective lines 11—11, 12—12 and 13—13 in Fig. 10, Fig. 12 being in part a schematic development as would be found if its section were taken along the broken line 12—12 in Fig. 10.

Figure 1:
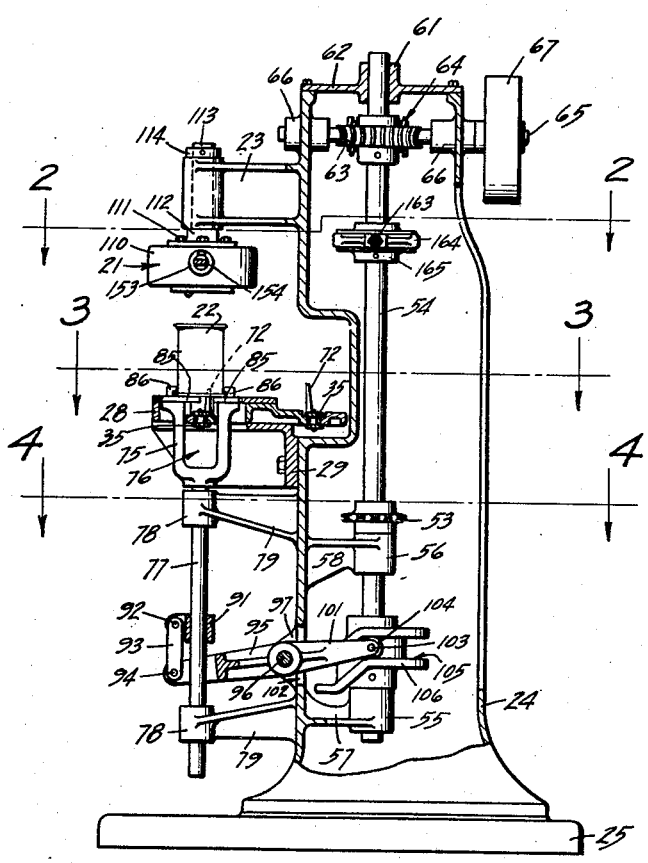

The testing head indicated in Fig. 1 by the numeral 21 may be suitably supported so that one end of a sealed can 22 may be inserted in the head for testing. This head 21 is held in fixed position on a bracket 23 extending outwardly from a frame column 24 which rests upon a base 25. The testing head is above a horizontal table 28 (see also Fig. 3) which is supported upon a bracket 29 secured to the column frame 24.

It is over this table 28 that the cans 22 are moved first into testing position and thence off the end of the table into a good can discharge lane or a leaky can discharge lane according to the condition of the can as determined by the test.

A conveyor chain 35 (Figs. 1 and 3) propels the can over the table and operates in a horizontal position within a groove 36 sunk into the upper surface of the table. This conveyor chain operates over an idler sprocket 37 mounted for rotation on a vertical stud 38 held in the table. Sprocket 37 is located at the entrance end of the machine and at the left end of the table as viewed in Fig. 3.

At the opposite or adjacent discharge end of the table 28 the conveyor chain 35 passes over a drive sprocket 41 which is secured to the upper end of a vertical shaft 42 (Figs. 3, 4 and 8). Shaft 42 is journaled in a bearing 43 formed in the table 28 and in a bearing 44 formed in a sub-table 45.

The sub-table 45 is supported from and is located beneath the table 28 and provides the supporting frame for the can separating unit. A pair of spacing rods 46 are secured at their top ends into the table 28 and provide the hanging supports for the sub-table which is bolted to their lower ends.

The shaft 42 carries a sprocket 51 (Figs. 4 and 8) and a chain 52 passes over this sprocket and extends through an opening in the side of the column 24 where it operates over a sprocket 53 mounted upon a vertical shaft 54 located in the column (see also Fig. 1).

Shaft 54 is journaled in two lower bearings 55 and 56 formed on bracket arms 57, 58 extending inwardly from the front wall of the column frame 24. The upper end of the shaft is journaled in a bearing 61 which is formed in a cover plate 62 bolted to and resting upon the upper end of the column.

The shaft 54 also carries a worm gear 63 which meshes with a worm 64 carried on a horizontal drive shaft 65. Shaft 65 is journaled in bearings 66 formed in the top of the column frame 24 and is rotated in any suitable manner as by application of power to a drive pulley 67 mounted on the rear end of the shaft outside of the column. The drive shaft 65 is adapted for continuous rotation and by reason of the connections described the shaft 42 is similarly actuated to continuously move the conveyor chain 35.

Sealed cans 22 which have been previously vacuumized and which are to be tested in the machine are positioned upon the left end of the table 28 (as viewed in Fig. 3) and are moved between horizontal spaced guide bars 71 which hold them in a stright line of travel as they are moved by the conveyor chain 35. For this purpose upwardly extending fingers or lugs 72 are carried by certain links of the chain 35 and one of these lugs moving around the sprocket 37 engages behind a can as it rests upon the table 28 and moves it toward the testing station.

Directly beneath the testing head 21 and in front of the column 24 there is provided a can lift head 75 (Figs. 1 and 3). This head is cut away or slotted at 76 and the conveyor chain 35 and lugs 72 pass freely through the slot. The head 75 is mounted on the upper end of a vertical rod 77 which is slidably held in bearings 78 formed in brackets 79 extending outwardly from the front wall of the column 24.

The head 75 and rod 77 are raised and lowered in synchronism with the movement of the conveyor chain 35 so that as a can is brought over the head the latter is raised to lift the can into the testing head 21. This action moves the can up alongside of and then above the lug 72 of the conveyor chain which then passes under the elevated can and through the slotted portion 76 of the head.

The head 75 carries top plates 85, these plates being separated from each other so as not to interfere with the open slot of the head. Each plate 85 is formed with a short hooked can guide rail 86 and as the can moves over the head 75 and on to the upper surface of the plates 85 its extending bottom seam is engaged under these hooked sections. This provides holding elements for the can as it is raised into testing position with the ascending head 75.

The rod 77 carries a collar 91 (Fig. 1) which is pivotally secured at 92 to one end of a link 93 which at its lower end is pivoted at 94 to one arm of a lever 95. The lever 95 is mounted on a horizontal rock shaft 96 which is supported by and which rocks in bearings 97 formed in the front wall of the column 24.

The level 95 has also an arm 101 which extends through an opening 102 cut in the face of the column 24 and this arm carries a stud 103 on which is rotatably mounted a roller 104. The roller 104 operates in a groove 105 formed in a barrel cam 106 which is pinned to the lower end of the shaft 54. Rocking of the lever 95 through the medium of the cam 106 just described imparts the proper timed movement for lifting the rod 77 and the head 75 with the sealed can.

The head 21 is preferably formed with a body 110 (Figs. 1 and 5) which is bolted at 111 to the flange of a supporting collar 112 which is in turn carried on the lower end of a stationary shaft 113. It is the shaft 113 that is held within the bracket 23, a collar 114 pinned to the upper end of the shaft and resting upon the upper part of the bracket, providing the necessary locking engagement for the shaft.

The body 110 (Fig. 5) at its lower end is recessed at 121 and this provides a pocket for a disc 122 formed of suitable electric insulating material such as Bakelite, porcelain or the like and held in its seat by screws 123. The disc 122 is centrally apertured at 124 and is counter-bored at 125 to provide a seat for a flanged bushing 126.

This bushing extends through the opening and projects beneath the lower surface of the disc 122 (see also Figs. 6 and 7) and its lower end is threaded at 127. A clamping disc 128 is threadedly secured on this end of the bushing and its upper surface engages the lower surface of the disc 122, the bushing 126 being pulled into tight engagement with the disc and locking these parts together as a unit.

The disc 128 is cut away on its lower face to provide an annular seat 131 in which a rubber washer 132 is disposed. This washer adjacent its outer edge is securely held by a clamping ring 133 which threadedly engages at 135 with a reduced threaded lower end of the body 110.

The can 22 which is inserted in the testing head by the can lift 75 is provided with an upper flexible metallic end 141 (Figs. 5, 6 and 7) which may be joined to the body wall of the can in any suitable manner as by the usual extended double seam 142. It is the top edge or rim of this seam 142 that engages with the washer 132 when the upper end of the can is inserted in the testing head 21, the can being moved into the inside of the clamping ring 133, and this gives an unrestricted freedom of movement to the entire end, the full flexing of which results in a greater accuracy of test.

If the retained vacuum in a good can being tested is sufficiently high its flexible end 141 may be pulled in as shown in Fig. 5. When such a can is under test with its seam 142 securely clamped against the washer 132, the end 141 will usually remain bowed inwardly as shown by the dot and dash lines in Fig. 6. In many good cans, however, there will not be an inward bowing of the end, this being a matter of degree as to what the inside condition of the can is and therefore the absence of the inward bow of the end does not mean necessarily that the can is leaky.

The insulating disc 122 is formed with an annular groove 145 (Fig. 5) which may be cut in the upper surface of the disc, this groove being closed in an air-tight joint at its top by the bottom face of the body 110. The annular groove 145 may be connected with radial ports 146 (see also Figs. 6 and 7) which extend toward the center of the disc, these ports terminating adjacent the outer periphery of the shouldered bushing 126. Vertical slots 147 are cut in the threaded part 127 of the bushing 126 and the upper end of these slots communicate with the inner ends of the ports 146.

The lower ends of the slots 147 communicate with the space above the can end 141 and beneath the surface of disc 128. It is through these slots, ports and grooves that air is removed from this space as it is vacuumized for the testing operation. As to the vacuumizing action this space acts as a vacuum chamber within the head and will be so described. It will be understood that a new chamber is thus formed each time a can is inserted. The numeral 148 designates such a vacuum chamber. This is vacuumized in the following manner.

A horizontal bore 151 (Fig. 5) is cut into one side of the body 110 and provides a seat for the reduced inner end 152 of a valve body 153. This valve body extends radially of the head 21, its reduced end fitting tightly in the bore so that there will be no leakage of air. The valve body is centrally apertured and a valve 154 has sliding movement in the body and at the same time maintains an air-tight fit during such movement.

The valve carries a pin 155 (Figs. 2 and 5) at its outer end which provides pivotal connection for one end of a link 156. The outer end of the link is pivotally connected at 157 to one arm of a lever 158 which rocks back and forth on a stud 159 carried in a bracket 161 extending outwardly and to one side of the column frame 24.

The opposite end of the lever 158 is pivotally connected at 162 to an adjustable connecting rod 163 (see also Fig. 1) which provides connection with an eccentric strap 164. The strap 164 surrounds and operates on an eccentric 165 carried by the vertical shaft 54.

The valve 154 is in its outward position when the can is being brought into the testing head 21 as illustrated in Fig. 5. The annular groove 145 connects, at one side of the testing head body 110 and through a port 171, with the bore 151. This port 171 communicates with a similar opening 172 cut through the inner sleeve section 152 of the valve body 153, this opening 172 communicating with a chamber 173 formed in the testing head body 110 at the end of the valve 154.

A central horizontal port 175 is formed in the inner end of the valve, its inner end being open to the chamber 173 in the tester head. A radial or transverse port 176 is cut in the lower part of the valve 154 one end being in communication with the port 175. When the valve is in its outermost position (Fig. 5) this port 176 connects with a vent port 177 cut in the lower part of the valve body 153. During insertion of the can 22 into the tester head the communicating slots, ports or passageways 147, 146, 145, 171, 172, 173, 175, 176 and 177 are open to atmosphere and air in a balanced condition lies therein.

With the can 22 clamped in the testing head (Fig. 6) the valve 154 is moved inwardly by the eccentric 165 just described and the port 176 is moved out of register with the port 177 thus cutting off communication with the outside atmosphere. In the innermost position of the valve a second radial port 181 (Fig. 5) in the valve member which also connects with its central port 175, comes into communication with a port 182 cut in the valve body 153, this being directly above the port 177.

This port 182 is connected with a suitable source of vacuum indicated here as a pipe 183, the interior of which is under vacuumized conditions at all times. As soon as registration between the ports 181 and 182 takes place, the air within the various slots, ports and passageways just considered is exhausted. At the same time air is removed from the vacuum chamber 148 (Fig. 6) above the flexible can end 141.

In this manner atmospheric pressure is removed from the outer face of the flexible end 141 and in the event that the sealed can 22 is a good can there will be substantially a balanced condition between the two outside and inside flexible end surfaces and the end wall will remain in its depressed or straight condition.

As to such a good can no work is performed in the testing apparatus and after the test the can will be again lowered from its clamped position by a return movement of the lift head 75. Prior to this return movement, however, the valve 154 will be again drawn out to its former position and atmospheric air will be restored to the vacuum chamber 148 or space above the can end and the can will be free to move downwardly with the descending lift head.

This good can which has just been tested returns to the surface of the table 28 directly in front of the next of the conveyor lugs or fingers 72 which thereupon engages behind and sweeps the can toward the left end of the table (Fig. 3). The can is now guided between spaced guide rails 191 which are in alignment with and form extensions of the guide rails 71.

The inner guide rail 191 is bent around the shaft 42 as at 192 and then merges into a reverse bend 193 extending on into a straight guide section 194. The outer guide rail 191 is bent outwardly at 195 where it merges into a straight section 196. The good tested can still being conveyed by the conveyor chain 35 is caused to follow the curved walls 192, 193 of the inner guide rail 191 and is held in its circuitous path by a switch 197.

Switch 197 is formed with a concave guide wall 198, one end of which at such time (Fig. 3) aligns with the inner wall of the outer guide rail 191. The switch 197 is secured to the upper end of a vertical shaft 201 the switch end at the point of connection being provided with a boss 202, one side of which cooperates with the curved wall 193 of the inner guide rail 191 to hold a can width of passage and to direct the can around the shaft 201 and into a good can lane. The good can lane is set off by the guide rail section 194 and a guide rail 203 spaced from it.

As long as the cans coming from the testing position are good cans, the switch 197 remains in the position illustrated in full lines in Fig. 3 and these cans are directed into the good can lane and pass between the guide rails 194, 203. This position of the switch, it will be remembered, is the passive result of the lack of closing of a switch actuating electric circuit at the testing head. When a can is leaky, however, conditions are entirely different as will now be pointed out.

A leaky can is one which has lost all or a part of its vacuum and the leaking of air through the leaks presents a condition of internal pressure which when the can is put under test by removal of air from the chamber 148, overbalances the small or the minus pressure on the upper face of the flexible end. The end thereupon flexes or bulges outwardly into the position shown in full lines in Fig. 7.

A movable button contact 211 (Figs. 6 and 7) rests in a pocket 212 formed in the disc 128. The lower end of this contact is formed with a rounded point 213 which extends down into the chamber space 148 over the top or flexible end 141 of the can 22. It is backed up by an enclosed spring 214, the upper end of which rests against a circular plate 215 inserted in the top of the disc 128. The plate 215 closes off the pocket 212.

A wire 216 is electrically connected with this plate which electrically connects, through the spring 214 and through the body of the disc 128, with the movable contact 211. The wire 216 is insulated from the body 110 and is contained in a channel 217 cut in the insulated disc 122 and in a port 218 (Fig. 5) and in a chamber 219 formed in the tester body 110. This wire 216 and its movable contact 211 provide one side of the electric switch actuating circuit previously referred to.

The spring 214 of the contact 211 is relatively light and the flexible end 141 of the can 22 whether or not it bulges engages and holds against the contact as long as the can is in the testing head. This insures a good electrical engagement between the contact point 213 and the can end wall but the spring is not sufficiently strong to offer any appreciable restriction to the flexing of the end.

A second fixed and adjustable contact is also located in the testing head and is formed in the following manner. The inside or open part of the bushing 126 provides a seal for a sleeve 221 (Figs. 5 and 6) formed of a suitable electrical insulating material such as Bakelite or porcelain. A contact post 222 is carried by and extends into the upper end of the sleeve 221 and is connected to a wire 223 which is properly insulated from the testing head body and also extends out through the chamber 219.

The lower end of the sleeve 221 is internally threaded for a contact member 225 which may be held at different heights relative to the sleeve 221 and to the inserted can top or end 141. By turning of the contact member the desired adjusted height is secured and the member is then locked in its adjusted position by a bolt 226 which threadedly engages in the post 222.

It will be observed by referring to Figs. 6 and 7 that the fixed contact member 225 is so positioned as to require a flexing or outward bending of the end 141 before it is engaged. When the contact is farther away from the can end or higher in the head a greater flexing action is required to cause engagement. By adjusting for this required flexing great accuracy may be had as to the amount of pressure needed in the can under test before that particular can is considered a leaky can. In this way the testing elements may be set to pass a can as good which has lost, for example, only a few points of its original vacuum.

Figure 2:
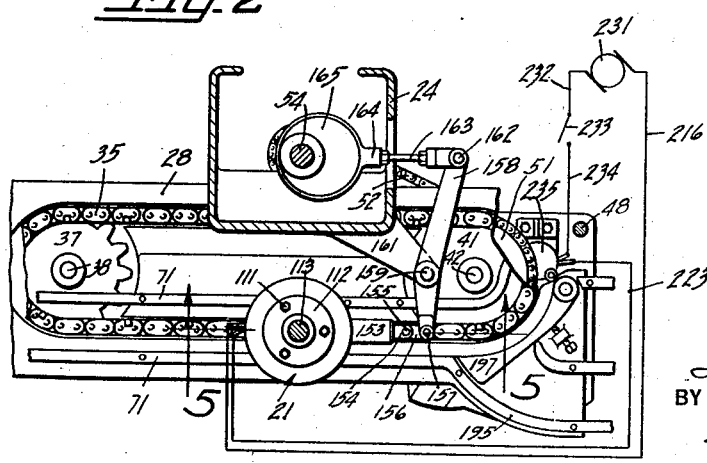

Fig. 2 illustrates one form of wiring diagram satisfactory for switch actuation and reference should be had to this wiring diagram as the closing of the required electric circuit by a leaky can is considered. The wire 216 is connected to one side of a source of electrical energy such as a generator 231. The opposite side of the generator may be connected by a wire 232 through a service switch 233 connected to a wire 234. The wire 234 connects with one side of the coil winding of a solenoid 235 (see Fig. 13 for details) which is closely associated with the controls for actuation of the switch 197.

The other side of the coil windings of the solenoid 235 connects with the wire 223 from the testing head. With the service switch 233 closed it will be observed that the circuit is incomplete as long as there is a gap between the contacts 211, 225 but when these contacts are electrically connected by the flexed metallic can end 141 the circuit is completed. Electrical energy flowing through the circuit then energizes the solenoid 235. A core pin 236 in the solenoid (Fig. 13) is thereupon lifted from the position shown in that figure and the result of such lifting action of the pin will now be considered in connection with the control parts relating to movement of the switch 197.

The switch 197 is connected to the upper end of the shaft 201 where it extends above the table 28, the upper end of this shaft being journaled in a bearing 241 (Fig. 8). The lower end of the shaft is journaled in a bearing 242 formed in the sub-table 45 (see also Fig. 10). The shaft 201 carries an arm 243 the outer end of which carries a pin 244 which provides a pivotal connection for a block 245 of an adjustable connecting rod 246.

The pin 244 also extends downwardly to provide connection for one end of a spring 247, the other end of which is carried on a fixed post 248 positioned in the sub-table. The spring 247 tends to hold the shaft 201 so that the switch 197 is in the good can directing position, this being the position illustrated in full lines in Fig. 3. The switch 197 rests against an adjusting bolt 249 which is threadedly secured in a lug 251 extending upwardly from the table 28. This limits the turning of the shaft 201 under the spring action and holds it so that its curved surface 198 is properly aligned with the inner guiding face of the outer guide rail 191.

The connecting rod 246 (Figs. 8 and 10) also carries a block 255 at its opposite end and is pivotally connected at 256 with an arm 257 of a shift lever 258. The lever 258 is mounted for rocking movement on a pin 261 which is held in a boss 262 formed in the sub-table 45. A bolt 263 and washer 264 connect with the upper end of the pin 261 and hold it in proper position. The lever 258 is also formed with an arm 271 which extends out and over a drum 272 mounted for rotation on the sub-table 45.

The drum 272 is rotatably held on a stud 273 (Fig. 12) which is seated in a boss 274 formed in the sub-table being held in fixed position by a nut 275 threadedly secured to the lower end of the stud. The drum continuously rotates as long as the testing machine is operating and to effect its rotation it is formed with gear teeth 276 which mesh with a pinion 277 (Figs. 9 and 10) carried on the shaft 42.

The drum 272 carries three headed pins 281 (Figs. 10 and 12) which are vertically and slidably disposed in spaced bores formed in the drum and each pin has two vertical positions within the disc. In the low position (as illustrated in Fig. 12) the head of the pin 281 is entirely beneath the upper surface of the drum and as long as the pin is in this position it will pass under and will not engage the arm 271 of the lever 258 as it is carried around by the drum.

This is the position of a pin 281 as long as the associated can being tested is a good can. At such time since there is no electric current flowing through the solenoid 235 and no work being done that might disturb the normal balance of parts the pin 281 remains in its lowered position.

In this low position the pin 281 is lightly held by a spring detent 282 (Fig. 12) the inner end of which rests within a depression 283 formed on the adjacent side of the pin. Each pin is prevented from rotation within its seat by a feather 284 which in no way restricts its vertical movement.

The pin 281 is lifted into its high position when the solenoid 235 is energized and reference should now be had to Figs. 8, 10 and 13 as this lifting movement is explained. The core pin 236 of the solenoid 235 rests on a ledge 291 cut in a block 292 which is secured to the lower part of a solenoid housing 293 in which the solenoid 235 is enclosed. This housing is formed with a foot 294 (Figs. 8 and 10) which rests upon the sub-table 45 being secured in rigid position by bolts 295.

A horizontal lever 296 is disposed on one side of the drum 272, one end 297 of the lever being in the same horizontal plane with the head of the core pin 236 when this pin rests upon the shoulder 291 (see Fig. 13). This lever is mounted on a vertical shouldered stud 298 (Figs. 9, 10 and 12) which is threadedly secured in a boss 299 formed in the sub-table 45.

With each half revolution of the shaft 42 the lever 296 is shifted some on its stud 298 and its end 297 is moved toward the block 292. If the can being tested is a good can and the solenoid 235 is deenergized the head of the core pin 236 blocks further movement of the lever 296 and prevents it moving into a position where it would lift one of the pins 281.

This shift or attempted movement of the lever at each cycle of operation is brought about by an arm 301 which is also pivotally mounted on the stud 298, this arm being located inside of two separated sections of the lever 296 adjacent its end 297 as best illustrated in Fig. 9. The arm 301 carries a stud 302 which supports a cam roller 303 and this roller lies in the path of one of two arms 304 formed in a boss 305 mounted on and turning with the shaft 42.

Lever 296 carries an upstanding lug 311 (Figs. 9 and 10) and the arm 301 carries a similar lug 312, these two lugs being positioned alongside each other. A spring 313 is mounted between the lugs with one end seated in each and this spring provides a yielding connection between the arm 301 and the lever 296. When one of the cam arms 304 engages and moves the roller 303 outwardly it shifts the arm 301 which in turn tends to similarly shift the lever 296 through the spring connection. If the head of the core pin 236 is in position to block this movement the spring 313 yields and permits full movement of the arm 301 while the lever 296 remains stationary.

In the event that a leaky can under test has closed the electric circuit through the solenoid 235 and the core pin 236 is in raised position and out of the way of the lever end 297, the lever 296 moves with the arm 301 and as it shifts on its pivotal mounting, an end 315 of the lever is moved over toward the drum 272. This lever end 315 is formed with an inclined lug extension 316 (Figs. 10, 11 and 12) which slips in under the drum and beneath the path of travel of the pin 281 which is being carried around by the rotating drum and which is then approaching that position.

This advancing pin 281 moves over the lever end 316 and rides up on the inclined surface, the pin being pushed up and brought into its upper position. In doing this the seat 283 is snapped past the spring detent 282 and as the pin reaches its uppermost position a second seat 317 positioned directly beneath the seat 283 presents itself to the detent which snaps back into this lower seat and holds the pin in its raised position.

This lifting of the pin takes place during the uninterrupted movement of the drum 272 and immediately following, the head of the raised pin strikes against the arm 271 of the lever 258, as shown in Fig. 4, and under the continued movement of the drum, the lever arm 271 moves outwardly or in a counter clockwise direction.

By means of the connecting parts between lever 258 and the connecting arm 243 the shaft 201 is moved clockwise so that the switch 197 (Fig. 3) is shifted from its full line position into the position illustrated by the dot and dash lines. In the latter position the curved wall 198 of the switch is moved out of working position and the straight wall on the back side of the switch thereupon forms a continuation for the straight section of the inner guide rail 191.

During the shifting of parts just described the tested, leaky can is being removed from the testing head and is being moved toward the switch by the conveyor chain. Upon reaching the shifted switch it is then crowded between the wall of the switch on one side and a curved end 321 of a guide rail 322 which is mounted on the table. The curved end 321 cooperates with the curved section 195 to direct the can into a leaky can lane formed by the spaced guide rails 196, 322.

As soon as the raised pin 281 leaves the inclined end 316 of the lever arm 315 to perform the work of shifting the switch just described, the lever 296 is shifted back into its normal position with the inclined end 316 out from under the drum 272. Three spaced inclined cam projecting walls 325 (Fig. 10) are formed on the periphery of the drum and one of these comes into engagement with a roller 326 mounted on a stud 327 carried in the arm 315 of the lever 296. This takes place as soon as the pin leaves the lever end 316.

The inclined cam wall 325 forcing against the roller 326 moves the lever 296 on its stud 298 and brings it back into its normal position, the lever end 297 at the same time moving out from under the core pin 236 of the solenoid 235. By this time the tested can has left the testing head and the solenoid is deenergized. The pin 236, therefore, drops back to its ledge 291 as the lever end moves out from under coming again in position for blocking the next movement of the lever in the event that the following can is a good can.

It will be observed (Figs. 4 and 10) that the arm 271 is curved at its outer free end and this shape is such as to hold the switch 197 stationary during the passage of the can from the table into the leaky can lane. As soon, however, as the pin has passed beyond the end of this arm the spring 247 draws back the switch 197 and also restores the lever 258 to its normal position of Fig. 10.

The raised pin 281 upon leaving the end of the arm 271 passes a depressing device which comprises a bracket 331 (Figs. 10 and 12) bolted on the sub-table 45, and a horizontal shelf 332. This shelf extends over the upper surface of the drum 272 and in the path of the head of the advancing pin 281. The shelf 332 is formed with an inclined under surface 333 (Figs. 8 and 12) which when engaged by the head of the pin, forces the pin downwardly into its low position.

During this movement the detent 282 snaps out of the seat 317 and again snaps back into the seat 283. In this manner each raised pin is depressed and positioned for subsequent lifting for the next leaky can. If the lever end 316 is not brought beneath the end of a pin, it remains in its lower position and the switch 197 remains in its normal can directing position as previously described.

It is thought that the invention and many of its attendant avantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for testing vacuumized sealed cans having flexible, metallic sections, comprising in combination, a testing head adapted to receive one end of a can to be tested with a said flexible section forming with the head an air-tight chamber formed by the application of a rim of a can, a fixed electrical contact disposed in said head and projecting centrally of said formed chamber and in alignment with the center of said flexible end section of a positioned can, a second electrical contact also mounted in said head and spaced from said fixed contact and also projecting in said chamber when formed, means for vacuumizing said chamber, an electric circuit completed through the said flexible metallic section when it flexes a predetermined amount by utilizing the electrical connection between said fixed contact and the center of said flexed metallic section and also between the second of said contacts and the wall of said flexed can end section, said flexure being the result of an internal pressure in the can in excess of the pressure in said vacuumized chamber, adjusting means for determining the amount of said predetermined flexure necessary to complete said electric circuit by shifting the position of said fixed contact relative to said flexible end section, a continuously and horizontally operating endless chain conveyor, and a lifter for taking cans from said conveyor and applying them successively to said testing head.

2. An apparatus for testing vacuumized sealed cans having flexible metallic sections comprising in combination a testing head adapted to receive the flexible end of a sealed can to be tested by engaging the surrounding rim of the can end and forming an air-tight chamber between the head wall and the flexible end wall and within said surrounding rim, a fixed electrical contact disposed in said head and projecting centrally of said formed chamber and in alignment with the center of said flexible end section of a positioned can, a yieldable electrical contact also mounted in said head and spaced from said fixed contact and also projecting in said chamber when formed, an electric circuit adapted to be completed through said flexible end wall by its engagement with said contacts, means for vacuumizing said chamber to remove air pressure from the outside wall of said flexible end section to permit flexing thereof and to permit engagement therewith of both of said contacts in the event that the tested can has leaked and has lost its vacuum, and electrical means connected to said circuit operable through said contacts and upon the flexing of said end section of a leaky can under test for diverting said leaky can from the apparatus.

3. An apparatus for testing vacuumized sealed cans having flexible metallic sections comprising in combination a testing head for the cans to be tested which is adapted to receive a flexible end of a sealed can, said can when received in said head forming an air-tight chamber between the head wall and the flexible end wall, a conveyor for bringing a can into position below said head prior to testing and for removing the tested can from the head after testing, a lifter for effecting engagement between the upper flexible end of said can and said testing head wall to form an air-tight chamber, an electrical contact disposed in said head and projecting centrally of said formed chamber and in alignment with the center of the flexible end section of said positioned can, a second electrical contact also mounted in said head and spaced from said fixed contact and also projecting into said chamber when formed, means for vacuumizing said chamber to remove air pressure from the outside wall of the enclosed end section of said can to permit flexing thereof and engagement therewith of said electrical contacts in the event that the tested can has leaked and has lost its vacuum, a switch for directing the travel of cans when removed from said head by said conveyor, and electric means operable through said contacts upon flexing of said end section of a leaky can under test for moving said switch into its leaky can deflecting position.

4. An apparatus for testing vacuumized sealed cans having flexible metallic sections comprising in combination a testing head adapted to receive the flexible end of a sealed can to be tested by engaging the surrounding rim of the can end and forming an air-tight chamber between the head wall and the flexible end wall and within said surrounding rim, means for elevating said can to form said chamber, a fixed electrical contact disposed in said head and projecting centrally of said formed chamber and in alignment with the center of said flexible end section of a positioned can, a yieldable electrical contact also mounted in said head and spaced from said fixed contact and also projecting in said chamber when formed, means synchronized with said can elevating means for vacuumizing said chamber to remove air pressure from the outside wall of said flexible end section to permit flexing thereof and to permit engagement therewith of both of said contacts in the event that the tested can has leaked and has lost its vacuum, and electrical means operable through said contacts and upon the flexing of said end section of a leaky can under test for diverting said leaky can from the apparatus.

FRED G. FOSS.